United States Patent [19]

King

[11] Patent Number: 4,587,518

[45] Date of Patent: May 6, 1986

[54] MONITOR AND CONTROL SYSTEM FOR WATER PURIFICATION APPARATUS

[75] Inventor: Martin J. King, Largo, Fla.

[73] Assignee: Baxter Travenol Laboratories, Inc., Deerfield, Ill.

[21] Appl. No.: 439,679

[22] Filed: Nov. 8, 1982

[51] Int. Cl.$^4$ ............................................. G08B 21/00
[52] U.S. Cl. ..................................... 340/603; 210/85; 210/96.2; 324/441
[58] Field of Search ................. 340/603; 210/96.2, 85, 210/103, 149, 143; 324/441, 439, 450, 438, 140 D; 203/3

[56] References Cited

U.S. PATENT DOCUMENTS

| | | | |
|---|---|---|---|
| 3,029,379 | 4/1962 | Ingram | 324/441 |
| 3,131,346 | 4/1964 | Parke | 324/441 |
| 3,255,417 | 6/1966 | Gottlieb | 324/140 D X |
| 3,990,066 | 11/1976 | Malmgren | 210/85 X |
| 4,333,023 | 6/1982 | Hood, Jr. | 307/310 |

Primary Examiner—Charles A. Ruehl
Assistant Examiner—Daniel Myer
Attorney, Agent, or Firm—Paul C. Flattery; Kay H. Pierce

[57] ABSTRACT

A monitor and control system for water purification apparatus includes first and second conductivity cells located in the input water path and the purified product water path of the apparatus, respectively. The conductivity cells produce output signals exhibiting amplitudes representative of the impurity concentrations in the respective water paths. These signals are detected and modified by circuitry which imposes logarithmic characteristics upon the two signals. The two logarithmically variable signals are differentially combined to produce a signal for display which is representative of the percent of impurity rejection of the water purification apparatus. The detected signal are also individually combined with signals representative of the temperature of the water being processed. The temperature-corrected signals are then displayed to provide an indication of the impurity concentrations of the input and purified water paths in parts per million. Treated water which exceeds desired limits of percent impurity rejection or impurity concentration is detected to cause the generation of an alarm signal. The alarm signal indicates that the apparatus is producing treated water which does not meet the desired criteria of water purity.

2 Claims, 4 Drawing Figures

MONITOR AND CONTROL SYSTEM FOR WATER PURIFICATION APPARATUS

This invention relates to water purification apparatus and, in particular, to monitor and control systems for a reverse osmosis water purification system.

U.S. patent application Ser. No. 439,680 filed 11-8-82 now U.S. Pat. No. 4,498,982, entitled "REVERSE OSMOSIS WATER PURIFICATION SYSTEM", describes a water purification system which employs the principle of reverse osmosis. In the reverse osmosis process, a stream of untreated water is pumped at elevated pressure into a pressure resistant vessel containing a semipermeable membrane. Some of the water permeates across the membrane and is collected as purified product water in a low pressure output line while the remainder of the original stream exits the vessel, where it is depressurized for recirculation or disposal.

As untreated water is being processed by the system it is desirable to monitor the operation of the system to ensure that product water of the desired purity is being produced. The untreated water will generally contain impurities in the form of salts which are to be rejected by the membrane as purified water permeates through it. The membrane can be expected to reject a minimum percentage of the salts in the untreated water. Hence, it is useful to monitor the system operation in terms of the percentage of the salt content of the untreated water that is rejected by the membrane in the production of purified water.

It is to be expected that the reverse osmosis membrane will become less efficient after repeated use as salts collected on it and its permeability characteristic is reduced through blockage. This is especially so when the input water being processed is highly contaminated with impurities. It is then desirable to know in absolute terms the impurity content of the product water in parts per million as compared with the impurity content of the untreated water. Comparison of impurity concentrations will provide an accurate indication of membrane efficiency, even when especially contaminated water is being processed. The temperature of the water will affect measurements of impurity concentrations and thus water temperature must be taken into consideration in any computation of impurity concentration.

In accordance with the principles of the present invention, a monitor and control system for water purification apparatus is provided. First and second conductivity cells are located in the premembrane input water path and the purified product water path of the apparatus, respectively. The conductivity cells are used to produce output signals exhibiting amplitudes representative of the impurity concentrations in the respective water paths. These signals are detected and modified by circuitry which imposes logarithmic characteristics upon the two signals. The two logarithmically variable signals are differentially combined to produce a signal for display which is representative of the percent of impurity rejection of the water purification apparatus.

The detected signals are also individually combined with signals representative of the temperature of the water being processed. The temperature-corrected signals are then displayed to provide an indication of the impurity concentrations of the premembrane and purified water paths in parts per million.

In accordance with a further aspect of the present invention, the production of treated water which exceeds desired limits of percent impurity rejection or impurity concentration is detected to cause the generation of an alarm signal. The alarm signal indicates that the apparatus is producing treated water which does not meet the desired criteria of water purity. The alarm also indicates when the percent impurity rejection of the apparatus is below the desired performance criteria.

Figure 1:
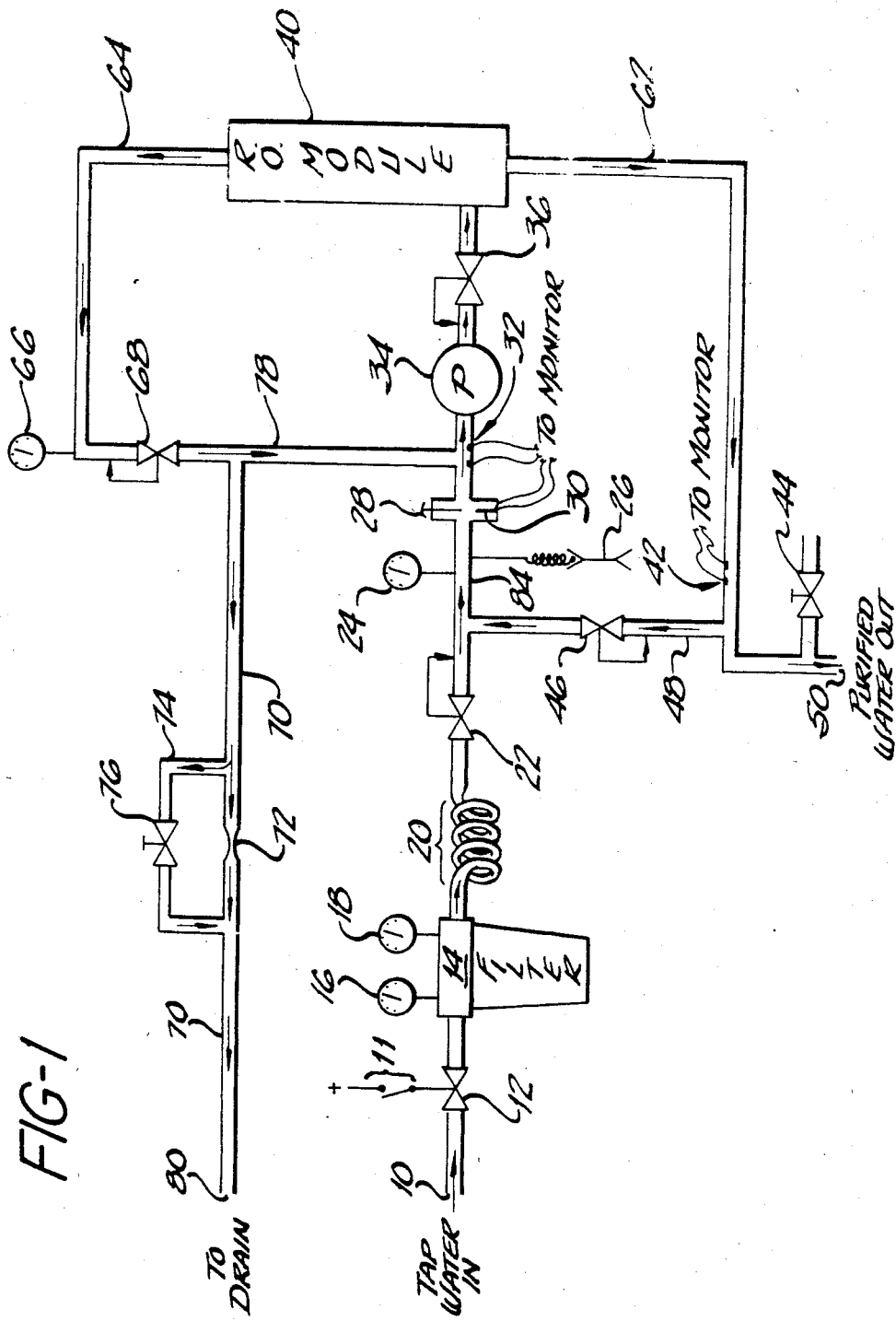
FIG. 1 illustrates schematically a reverse osmosis water purification arrangement.

Referring to FIG. 1, a reverse osmosis system constructed in accordance with the principles of the present invention is shown schematically. Untreated tap water enters the system through an inlet 10, and is passed by an inlet solenoid valve 12 under control of an on/off switch 11. The inlet water enters a filter 14, which filters out particulate matter and removes the chlorine from the inlet water. The filter includes a ten micron carbon impregnated filter element. The chlorine must be removed since chlorine can damage the membrane used in the reverse osmosis module. The water pressure at the inlet and outlet of the filter 14 is monitored by gauges 16 and 18. During normal operation the gauge pressure should be virtually the same. A greater than 10 psi differential between the inlet and outlet gauges of the filter 14 indicates that the filter is becoming clogged and should be replaced.

The filtered water then flows through a coil of tubing 20, which is wound around the motor and will be described in futher detail in conjunction with FIG. 2. The inlet water then flows through a pressure regulator 22. The pressure regulator 22 controls the water pressure at its outlet so that the water pressure will not exceed 20 psi. Depending upon the pressure of the inlet water, water pressure at the input to the pressure regulator can exceed 20 psi. A flow of inlet water, now at approximately 20 psi, enters the inlet line 84 to the pump and reverse osmosis module.

In the inlet line 84, a pressure gauge 24 monitors water pressure to insure that water pressure remains at about 20 psi. A one psi check valve 26 is coupled to the inlet line 84 to inject formalin into the inlet water. The injected formalin is used to sanitize the water since the water now has no chlorine content. The inlet water flows past a pressure switch 28, which turns the system off if water pressure in the inlet line 84 drops below 6 psi. The pressure switch 28 thereby protects the pump against cavitation. A temperature sensor 30 senses the inlet water temperature and provides an output signal to a monitor (not shown). The inlet water also flows past a conductivity cell 32, which also provides an electrical signal for the monitor.

The inlet water then enters the pump 34, which increases the water pressure from about 20 psi to approximately 200 psi. The pressurized water is applied to the reverse osmosis module 40 by way of a 25 psi check valve 36. This check valve 36 closes when the outlet water pressure of the pump drops below 25 psi to prevent the instantaneous reflection of high water pressure back to the gauge 24 when the pump 34 is turned off. This protects the gauge and other components in the low pressure 20 psi loop preceding the pump.

Inlet water, now at 200 psi enters the reverse osmosis module 40 where some of the water permeates the module membrane to produce purified product water in outlet line 62. The balance of the inlet water which does not permeate the membrane exits the module through a line 64. The module outlet pressure in line 64 remains at about 200 psi and is monitored by a pressure gauge 66. The reverse osmosis membrane may comprise, for example, a thin-film composite membrane formed by depositing a thin polymer coating on a microporous polysulfone support layer.

The water pressure in the outlet line 64 is maintained at approximately 200 psi by a back pressure regulator 68, which opens when the water pressure in line 64 exceeds 200 psi. Water passed by the back pressure regulator flows into a drain line 70 and a recirculation line 78. The water in the recirculation line 78 reenters the inlet line 84 at a point opposite the conductivity cell 32. Water in the drain line 70 passes through a 500 cc per minute orifice 72 and then to the drain through an outlet 80. A line 74 bypasses the orifice 72 during rinsing operations, at which time the rinse valve 76 is opened. Purified product water in line 62 flows past a conductivity cell 42, which detects the level of impurities remaining in the water. The purified water then is free to flow out of an outlet 50. A sampling port 44 may be opened if it is desirable to take a sample of the purified water. When both the sampling port 44 and a port (not shown) connected to the outlet 50 are closed, the purified water pressure builds in a return line 48, which soon opens a one psi check valve 46. The unused purified water then recirculates through the system by reentering the inlet line 84.

Figure 2:
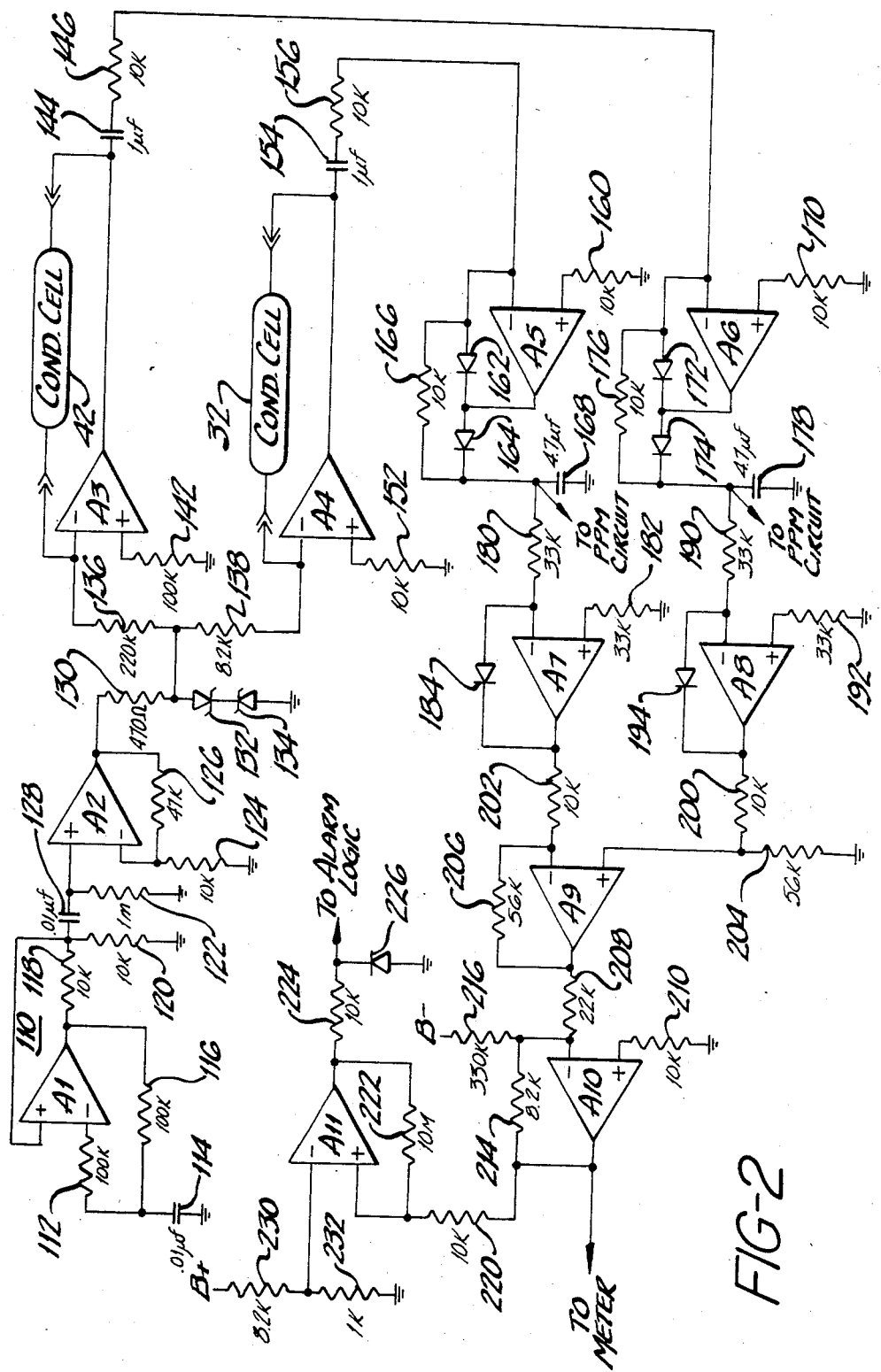
FIG. 2 illustrates in schematic diagram form circuitry for the measurement and detection of the percent rejection of water impurities.
Figure 3:
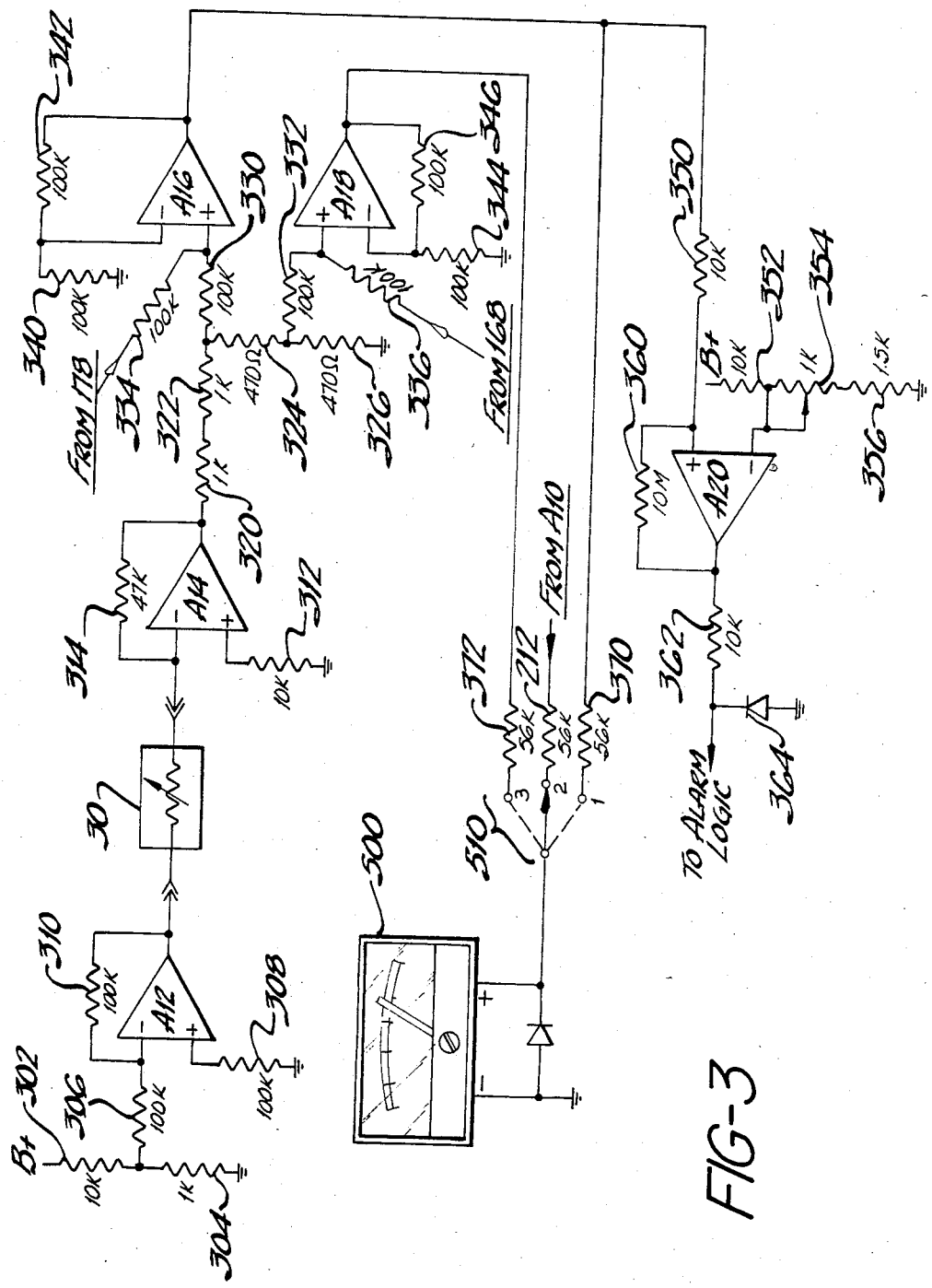
FIG. 3 illustrates in schematic diagram form circuitry for the measurement, detection and display of water impurity concentration.
Figure 4:
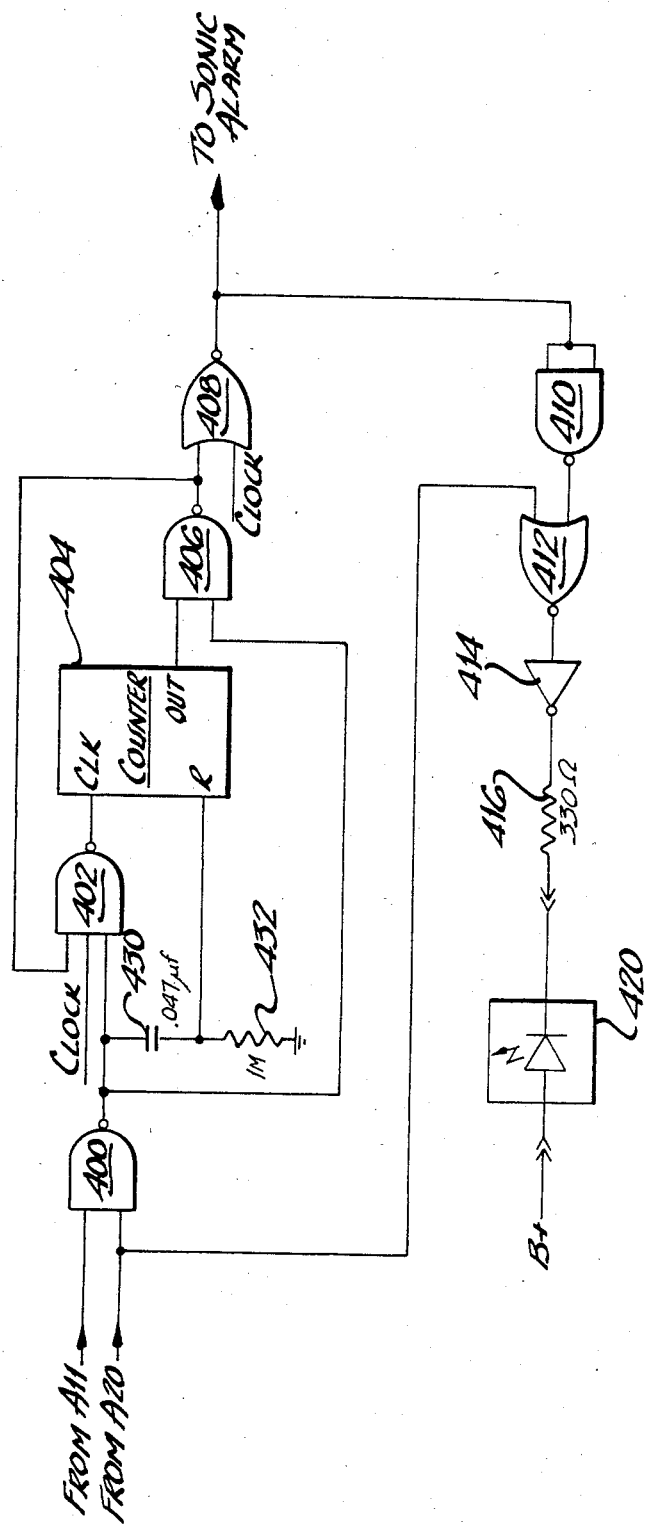
FIG. 4 illustrates in schematic diagram form an alarm system utilized in conjunction with the arrangements of FIGS. 2 and 3.

A monitor and control system for the arrangement of FIG. 1 is shown schematically in FIGS. 2 through 4. Referring first to FIG. 2, an oscillatory signal is developed by an oscillator 110. An amplifier A1 has its inverting input coupled to the serial combination of a resistor 112 and a capacitor 114. A feedback resistor 116 is coupled between the output of the amplifier and the junction of resistor 112 and capacitor 114. The output of amplifier A1 is coupled to ground by the serial combination of a resistor 118 and a resistor 120. The noninverting input of amplifier A1 is directly connected to the junction of resistors 118 and 120. Selection of the values of resistor 116 and capacitor 114 determine the frequency of oscillation, which in this example is approximately 430 hertz. The exact frequency of oscillation is not critical in this system.

The junction of resistors 118 and 120 is connected by a coupling capacitor 128 to the noninverting input of a limiting amplifier A2. A load resistor 122 is coupled between the noninverting input of amplifier A2 and ground. The inverting input of amplifier A2 is coupled to ground by a resistor 124, and a feedback resistor 126 is coupled between the output of amplifier A2 and its inverting input. Amplifier A2 is driven into limiting by the oscillatory signal to produce a clipped and limited output square wave. The output of amplifier A2 is coupled by way of a resistor 130 to the anode of zener diode 32, which has its cathode coupled to the cathode of a second zener diode 134. The anode of zener diode 134 is coupled to ground. Zener diodes 132 and 134 limit the swing of the applied waveform to a symmetrical ±5 volts.

The symmetrical square wave at the anode of zener diode 132 is coupled to the inverting input of an amplifier A3 by a resistor 136, and to the inverting input of an amplifier A4 by a resistor 138. The noninverting input of amplifier A3 is coupled to ground by a resistor 142 and the noninverting input of amplifier A4 is coupled to ground by a resistor 152. The two-electrode conductivity cells 42 and 32 of FIG. 1 are coupled between the respective outputs and the inverting inputs of amplifiers A3 and A4. The conductivity cells may be constructed as described in the aforementioned U.S. patent application Ser. No. 439,680 filed 11-8-82 now U.S. Pat. No. 4,498,982. The resistances of the conductivity cells vary with the impurity concentration of the water, and exhibit lower resistances as the respective impurity concentrations increase. Thus, the higher the impurity concentrations, the greater the negative feedback provided by the conductivity cells and hence the lower the amplitude of the output signals. In effect, the amplitudes of the square waves produced by amplifiers A3 and A4 are attenuated by greater impurity concentrations in the water.

The outputs of amplifiers A3 and A4 are coupled by way of respective coupling capacitors 144 and 154, and resistors 146 and 156, to inverting inputs of amplifiers A6 and A5, respectively. Amplifiers A6 and A5 are arranged to perform peak detection of the waveforms produced by amplifiers A3 and A4. The inverting input of amplifier A5 is coupled to the output of the amplifier by a diode 162. The output of amplifier A5 is coupled by a diode 164 to one plate of a capacitor 168, the other plate of which is coupled to ground. A resistor 166 is coupled between the anode of diode 162 and the cathode of diode 164. A resistor 160 is coupled between the noninverting input of amplifier A5 and ground. Similarly, a diode 172 is coupled between the inverting input of amplifier A6 and the output of the amplifier. A diode 174 is coupled between the output of amplifier A6 and one plate of a capacitor 178, the other plate of which is coupled to ground. A resistor 176 is coupled between the anode of diode 172 and the cathode of diode 174. A resistor 170 is coupled between the noninverting input of amplifier A6 and ground.

The diodes coupled across amplifiers A5 and A6 rectify the applied signal waveforms. The rectified signals are then peak detected across capacitors 168 and 178, respectively. The peak detected signals are applied to the parts per million circuit shown in FIG. 3, and are also applied to the inverting inputs of amplifiers A7 and A8 by resistors 180 and 190, respectively.

Amplifiers A7 and A8 impose logarithmic characteristics on the peak detected signals. The inverting input of amplifier A7 is coupled to the output of the amplifier by a diode 184. The inverting input of amplifier A8 is coupled to the output of amplifier A8 by a diode 194. The noninverting input of amplifier A7 is coupled to ground by a resistor 182, and the noninverting input of amplifier A8 is coupled to ground by a resistor 192. The feedback connected diodes 184 and 194 exhibit the typical logarithmic diode characteristic, and thus the output signals of amplifiers A7 and A8 will vary logarithmically as a function of the peak detected signals.

Since the two linearly varying peak detected signals have been converted to logarithmic signals, they may now be subtracted by differential combination to form a signal representative of the ratio of the two peak detected signals. Errors due to temperature effects need not be considered, as they will cancel in the ratio signal.

The output of amplifier A8 is coupled to the noninverting input of an amplifier A9 by a resistor 200. A resistor 204 is coupled between the noninverting input of amplifier A9 and ground. The output of amplifier A7 is coupled to the inverting input of amplifier A9 by a resistor 202. A feedback resistor 206 is coupled between the inverting input of amplifier A9 and its output. Amplifier A9 thus performs a differential subtraction of the applied logarithmically varying signals to produce a ratio representative signal. The output signal of amplifier A9 represents the impurity concentration of the purified product water measured by conductivity cell 42 divided by the impurity concentration of the inlet water to the reverse osmosis module measured by conductivity cell 32. The output signal of amplifier A9 thus represents the percent impurity rejection achieved by the reversed osmosis module.

The output of amplifier A9 is coupled to the inverting input of an amplifier A10 by a resistor 208. The noninverting input of amplifier A10 is coupled to ground by a resistor 210. A feedback resistor 214 is coupled between the inverting input of amplifier A10 and its output. Amplifier A10 functions as a buffer amplifier to drive the meter 500 shown in FIG. 3, which displays the percent of impurity rejection. A resistor 216 is coupled between the inverting input of amplifier A10 and a B-voltage supply. The current conducted by resistor 216 effects a positive voltage offset through amplifier A10 so that the output signal of amplifier A10 will use the full meter scale and not swing negative and peg the needle of the meter 500.

The percent rejection signal, being logarithmic, is displayed as such on the meter 500. The logarithmic display advantageously exhibits increased sensitivity and accuracy in the vicinity of 90% impurity rejection, which is the region of greatest interest in system operation. Impurity rejection percentages of less than 90% are displayed with decreasing sensitivity by reason of the logarithmic signal.

The percent rejection signal at the output of amplifier A10 is applied to the noninverting input of an amplifier A11 by a resistor 220. A feedback resistor 222 is coupled between the noninverting input of amplifier A11 and the output of the amplifier. Serially coupled resistors 230 and 232 are connected between a B+ voltage supply and ground. The inverting input of amplifier A11 is coupled to the junction of resistors 230 and 232 to apply a reference voltage to the inverting input of the amplifier. The reference voltage represents a 70 percent level of impurity rejection, and is differentially compared with the percent rejection signal produced by amplifier A10. When the percent rejection drops below 70 percent, the output signal of amplifier A11 goes low to trigger the alarm logic shown in FIG. 4. The output of amplifier A11 is coupled to the alarm logic by a resistor 224, and a diode 226 is coupled between the end of resistor 224 remote from amplifier A11 and ground to prevent the signal at the cathode of the diode from going below ground level.

Referring to FIG. 3, circuitry for detecting and displaying the impurity concentrations of the input water and product water of the arrangement of FIG. 1 is shown. Resistors 302 and 304 are serially coupled between the B+ supply and ground to produce a reference voltage at their junction. This reference voltage is applied to the inverting input of an amplifier A12 by a resistor 306. The noninverting input of amplifier A12 is coupled to ground by a resistor 308, and a feedback resistor 310 is coupled between the output of the amplifier and its inverting input. Amplifier A12 is arranged as a buffer amplifier to drive thermistor 30, which senses the temperature of the inlet water to the reverse osmosis module as shown in FIG. 1. The current conducted by the thermistor 30 is applied to the inverting input of an amplifier A14 to vary the gain of amplifier A14 as a function of water temperature. The noninverting input of amplifier A14 is coupled to ground by a resistor 312, and the output of amplifier A14 is coupled to its inverting input by a feedback resistor 314. The temperature representative signal produced by amplifier A14 is dropped across a voltage divider including serially coupled resistors 320, 322, 324, and 326. The signal at the junction of resistors 322 and 324 is applied to the noninverting input of an amplifier A16 by a resistor 330 and the signal at the junction of resistors 324 and 326 is applied to the noninverting input of an amplifier A18 by a resistor 332. The noninverting input of amplifier A16 is coupled to capacitor 178 of FIG. 2 by a resistor 334, and the noninverting input of amplifier A18 is coupled to capacitor 168 of FIG. 2 by a resistor 336. The resistor pairs 334, 330, and 332, 336, each sum the temperature representative voltage with the peak detected impurity concentration representative signals at the inputs of amplifiers A16 and A18. In this way, the impurity concentration representative signals are compensated for the effects of temperature variation in the water. The inverting input of amplifier A16 is coupled to ground by a resistor 340, and to the output of the amplifier by a feedback resistor 342. The inverting input of amplifier A18 is coupled to ground by a resistor 344 and to the output of the amplifier by a feedback resistor 346. The output of amplifier A16 is coupled to position 1 of a three position switch 510 by a resistor 370, and the output of amplifier A18 is coupled to position 3 of the three position switch 510 by a resistor 372. The center position 2 of the three position switch is coupled to the output of amplifier A10 of FIG. 2 by a resistor 212. The arm of the switch 510 is coupled to the meter 500.

The three position switch 510 is normally set in the center position 2 to display the percent of impurity rejection achieved by the system on the meter 500. When the arm of the switch is moved to position 1, the parts per million of impurity concentration in the purified product water is displayed on the meter. When the arm of the switch is moved to position 3, the impurity concentration to the premembrane inlet water to the system in parts per million is displayed on the meter 500.

The output signal of amplifier A16, which is representative of the impurity concentration of the product water, is applied to the noninverting input of an amplifier A20 by way of resistor 350. The inverting input of amplifier A20 is coupled to the tap of a voltage divider, including the serial connection of a resistor 352, a potentiomter 354, and a resistor 356. The reference voltage at the inverting input of amplifier A20 is representative of an impurity concentration of 80 parts per million. A feedback resistor 360 is coupled between the noninverting input of amplifier A20 and its output. The output of amplifier A20 is coupled to the alarm logic of FIG. 4 by a resistor 362. A diode 364 is coupled between the end of resistor 362 remote from amplifier A20 and ground. When the impurity concentration of the product water in the arrangement of FIG. 1 exceeds 80 parts per million, the output signal of amplifier A20 changes state to trigger the alarm logic.

FIG. 4 is a schematic drawing of logic for activating system alarms when undesirable operating conditions are detected. The signal produced by amplifier A11, which is representative of the percent impurity rejection of the system, is applied to one input of a NAND gate 400. The signal produced by amplifier A20, which is representative of product water impurity concentration, is applied to a second input of NAND gate 400 and to an input of a NOR gate 412. The output of NAND gate 400 is coupled to inputs of NAND gate 402 and 406, and to the reset input of a counter 404 by way of a capacitor 430. A resistor 432 is coupled between the reset input of counter 404 and ground to provide a charging time constant for capacitor 430. A clock signal is applied to the second input of NAND gate 402, and the output of NAND gate 406 is coupled to a third input of NAND gate 402. The output of NAND gate 402 is coupled to the clock input of the counter 404.

The output of the counter 404 is coupled to a second input of NAND gate 406, the output of which is also coupled to an input of a NOR gate 408. The clock signal is applied to a second input of NOR gate 408.

The output of NOR gate 408 is coupled to a sonic alarm (not shown) and to the two inputs of a NAND gate 410. The output of NAND gate 410 is coupled to a second input of NOR gate 412. The output of NOR gate 412 is coupled to the input of an inverter 414, the output of which is connected by way of a resistor 416 to a light emitting diode 420. The second electrode of the light emitting diode 420 is coupled to the B+ supply.

When amplifier A11 senses that the percent of impurity rejection provided by the reverse osmosis module has fallen below 70 percent, the output of amplifier A11 produces a low going signal which is applied to NAND gate 400. The output of NAND gate 400 then goes high which enables the input of NAND gates 402 and 406. The level transition of the output signal of NAND gate 400 from a low level to a high level is differentiated by capacitor 430, which applies a positive going spike to the reset input of counter 404. This spike resets counter 404 and disappears as resistor 432 recharges capacitor 430. The counter 404 is now enabled to begin counting up from a zero count, and will count the pulses of the clock signal transmitted by enabled NAND gate 402.

The counter 404 will produce an output signal when it attains its maximum count, which is a function of the number of stages in the counter and the frequency of the applied clock signal. When the counter reaches its maximum count, it produces a high signal so that both inputs of NAND gate 406 will now be high. The output signal of NAND gate 406 goes low, which disables NAND gate 402 so that clock pulses will no longer be applied to the counter 404. The low signal produced by NAND gate 406 is applied to one input of NOR gate 408, which will produce a pulsing output signal in synchronism with the clock signal applied to its second input. This pulsing signal will intermittently beep the sonic alarm, and is transmitted by NAND gate 410 to an input of NOR gate 412. If the second input to NOR gate 412 is low at this time, indicating that amplifier A20 has sensed a product water impurity concentration in excess of 80 parts per million, the pulsing signal will be applied to inverter 414 by NOR gate 412. Inverter 414 then drives the light emitting diode 420 in a flashing manner, indicating undersirable system operation. A similar alarm sequence occurs when amplifier A20 senses a product water impurity concentration of greater than 80 parts per million, except that the light emitting diode 420 will always flash as soon as the sonic alarm is sounded. This is because the output of amplifier A20 is connected to an input of NOR gate 412, thereby insuring that NOR gate 412 is conditioned to pass the pulsing signal produced by NOR gate 408 as soon as it occurs during the undesirable operating condition. The choice to flash the light emitting diode 420 as soon as the sonic alarm sounds during excessive parts per million impurity concentration in the product water was made because such an operating condition is deemed to be more serious than the dropping of percent rejection below 70 percent.

What is claimed is:

1. In a water purification system, including a source of water to be purified and an outlet at which purified water is produced, apparatus comprising:
   means for producing a first signal representative of the impurity concentration of said water to be purified;
   means for producing a second signal representative of the impurity concentration of said purified water;
   means, responsive to said first and second signals, for producing a percent rejection signal representative of the ratio of said second and first signals;
   means for producing a signal representative of the temperature of the water of said system;
   means for combining said temperature representative signal with said second signal to produce a temperature compensated impurity concentration signal;
   means for comparing said percent rejection signal with a signal representative of a given percent of impurity rejection to produce a first alarm signal when said percent rejection signal exceeds said given percent signal in a given sense;
   means for comparing said temperature compensated impurity concentration signal with a signal representative of a given impurity concentration to produce a second alarm signal when said temperature compensated impurity concentration signal exceeds said given impurity concentration signal in a given sense; and
   an alarm which is activated by said first and second alarm signals.
2. The arrangement of claim 1, wherein said alarm includes:
   a delay circuit having first and second inputs responsive to said alarm signals and an output at which a delayed alarm signal is produced in response to either of said alarm signal; and
   an indicator activated in response to the presence of said second alarm signal in combination with the presence of said delayed alarm signal.

* * * * *